United States Patent

Taubenheim et al.

[11] Patent Number: 6,060,997
[45] Date of Patent: May 9, 2000

[54] SELECTIVE CALL DEVICE AND METHOD FOR PROVIDING A STREAM OF INFORMATION

[75] Inventors: David B. Taubenheim, Boynton Beach; Thomas Raymond Nolan, Deerfield Beach; Craig Allen Lee, Boynton Beach; Bradley Davis, West Palm Beach, all of Fla.

[73] Assignee: Motorola, Inc., Schaumburg, Ill.

[21] Appl. No.: 08/962,920

[22] Filed: Oct. 27, 1997

[51] Int. Cl.[7] .................................................. G08B 5/22
[52] U.S. Cl. ........................ 340/825.44; 340/825.37; 455/38.4
[58] Field of Search .................... 455/38.4, 38.3; 340/825.44, 825.37, 825.55, 311.1, 825.27

[56] References Cited

U.S. PATENT DOCUMENTS

| | | | |
|---|---|---|---|
| 3,976,995 | 8/1976 | Sebestyen | 340/825.44 |
| 4,766,434 | 8/1988 | Matai et al. | 340/825.44 |
| 4,845,491 | 7/1989 | Fascenda et al. | 340/825.44 |
| 5,285,493 | 2/1994 | Wagai et al. | 455/566 |
| 5,710,757 | 1/1998 | May | 370/232 |
| 5,781,539 | 7/1998 | Tanaka | 370/312 |
| 5,926,104 | 7/1999 | Robinson | 340/825.44 |
| 5,929,772 | 7/1999 | Hwang | 340/825.44 |
| 5,933,088 | 8/1999 | Lipp | 340/825.44 |

*Primary Examiner*—Dwayne D. Bost
*Assistant Examiner*—Erika A. Gary
*Attorney, Agent, or Firm*—Keith A. Chanroo

[57] ABSTRACT

A selective call device (130) has a receiver (204) for receiving information at a first rate and a switch (229, 230) for selecting a streaming mode for providing the information. A processor (210) for determining when the streaming mode is selected, and in response thereto, creates a buffer (221, 222) for retaining the information. The processor (210) transfers the information from the buffer (221, 222) at a second rate for a display (228) to present the information that is transferred from the buffer (221, 222) as a continuous stream.

28 Claims, 8 Drawing Sheets

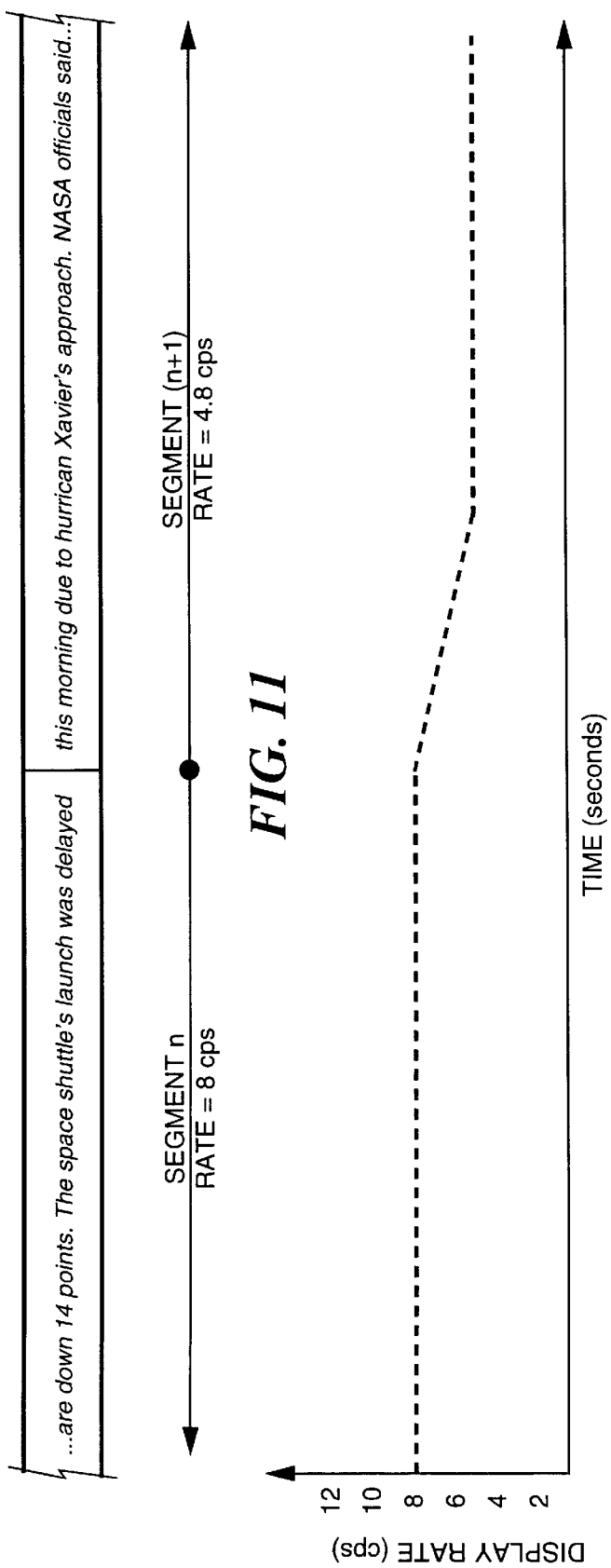

6,060,997

SELECTIVE CALL DEVICE AND METHOD FOR PROVIDING A STREAM OF INFORMATION

FIELD OF THE INVENTION

This invention relates in general to communication systems and more specifically to a method in selective call devices for providing a stream of information.

BACKGROUND OF THE INVENTION

A conventional selective call device, e.g., a receiver and/or transmitter, often can receive messages from more than one source. Sources are distinguished from each other typically by identifying information associated with each message. When an address information correlates or matches a predetermined address in the selective call device, the selective call device receives and stores the message from a particular information source.

Modern selective call services or service providers are capable of sending multiple types of data including information services, for example, stock market updates, weather, sports, news or other information, periodically to a subscribing selective call device (receiver or transceiver). Before long, hundreds of information services are likely to be broadcast to selective call devices. With this rapid expansion, the number of available information services will easily exceed the amount of information a selective call device can easily receive or search through for locating the information to which it has subscribed. The selective call device, being a small portable device, is unable to retain or store such large volume of data until the user is able or ready to read or receive the received and stored messages. Any attempt to retain such large volume of information associated with an information service-type selective call device would significantly increase the cost and size of the selective call device because of the amount of memory that would be needed.

Thus, what is needed is a method for enabling the selective call device to subscribe to various information services without significantly increasing the size and cost of the device by requiring an excessive amount of memory to retain the various information services for a suitable period of time.

BRIEF DESCRIPTION OF THE DRAWINGS

FIG. 11 is a timing diagram illustrating information being received at different data rates.

FIG. 12 is a graph illustrating a preferred embodiment for changing the rate of presenting the information according to the information data rate.

DESCRIPTION OF A PREFERRED EMBODIMENT

Figure 1:
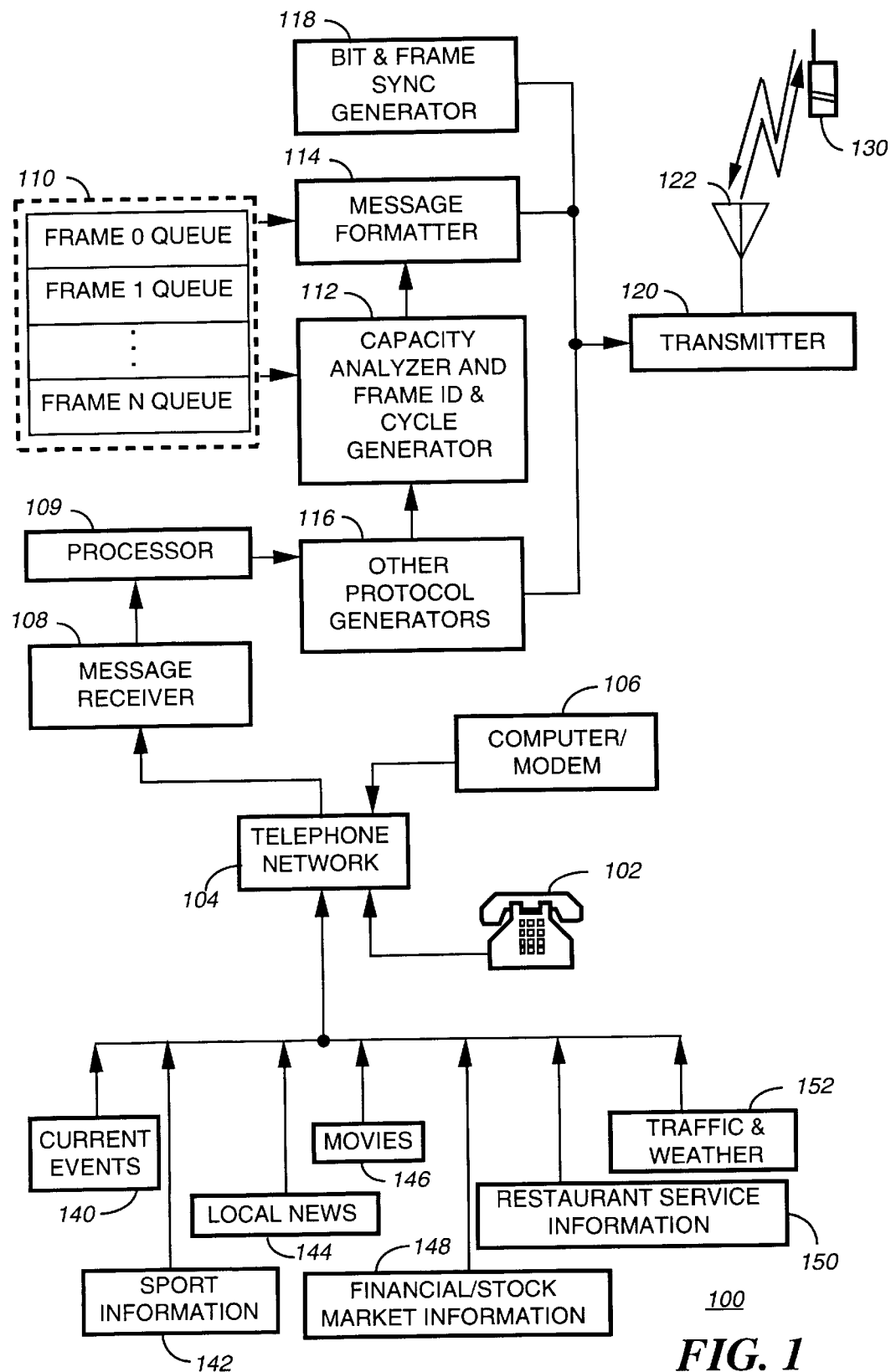
FIG. 1 is an electrical block diagram of a selective call system for providing information services in accordance with a preferred embodiment of the present invention.

FIG. 1 shows an electrical block diagram of a selective call system (or radio frequency communication system) for generating and transmitting (e.g., broadcasting) selective call signals (or communication signals) including a plurality of information services in accordance with a preferred embodiment of the present invention. The functions of the selective call system 100 are preferably implemented within software, for example within a MODAX 500 Selective Call Terminal which is manufactured by Motorola Inc. Typically, a message is sent in response to a user using a telephone 102 to initiate a transmission of a selective call message. As is well known, the telephone 102 couples to the selective call system 100, in particularly a base station or base site via a telephone network 104, the operation of which is well known to one of ordinary skill in the art. Similarly, a computer/modem 106 is also coupled to the telephone network 104 to enter information, for example alphanumeric or numeric messages. The telephone network 104 couples to a message receiver 108 which receives the messages to be transmitted (broadcast) to at least one of a plurality of selective call devices 130 typically from the public switched telephone network 104.

According to the preferred embodiment, a plurality of information services, e.g., 140–152 are preferably coupled to the telephone interface network which is coupled to a processor 109 via the message receiver 108. Those skilled in the art will appreciate that the plurality of information service providers 140–152 can also be received as radio frequency signal (or, microwave or other similar wireless and wireline methods) by an antenna.

When the base site processor 109 receives the information which are periodically transmitted as updates and received in information packets, the processor encodes the information as messages or in blocks in the form of selective call signals (or communication signals). Specifically, the processor 109, coupled to the message receiver 108, determines an appropriate protocol, preferably the FLEX™ protocol, and an address to encode with the information service. If the processor 109 determines that the message is to be sent via another signal format, it is passed to one of another protocol generator 116 which can include other protocol generators well known to one of ordinary skill in the art. When the processor has determined that the information services and any messages is to be transmitted on the FLEX™ protocol, the information are then encoded and stored in a frame queue buffer 110 which has queues (FRAME 0–N QUEUES) for the corresponding frames of the signal, and according to the preferred embodiment of the present invention, the corresponding number of frames N is 128. The predetermined frame identification (ID) of the selective call device 130 corresponding to the message is determined and the message is stored in the corresponding frame queue. A capacity analyzer and frame ID/cycle generator 112 determine the sequence of frame IDs to be transmitted and analyze the capacity of each frame to determine the cycle value to be used. The capacity analyzer 112 is also responsive to other protocols being transmitted. For example, if the expected occurrence of a frame is to be replaced by the transmission of one of the other protocols (thereby diminishing the capacity of the frame), the capacity analyzer 112 can account for this with the determined cycle value. A bit and frame sync generator 118 synchronously generates bit and frame synchronization signals. A message formatter 114 determines, in response to the address of the selective call device 130 and the frame queue, the frame in which the information is to be included. The messages are then formatted for transmission. A transmitter 120 accepts signals from blocks 118, 114 and 116 and modulates and transmits radio frequency selective call signals to selective call devices 130 via antenna 122 in a manner well known to those of ordinary skill in the art. The transmitter 120 preferably transmits information periodically to the selective call devices.

The capacity analyzer and frame ID and cycle generator 112 generate control data in response to the information 140–152 being received. The control data is formatted with the selective call signals to inform the selective call devices 130 the quantity of information that will be transmitted, the rate at which the transmission will sent, and also the frames in which the information will be transmitted. When there is a variation in the amount of information to sent to the selective call device 130, the selective call system encodes control data to indicate any such changes. The selective call device 130 uses this control data to determine the size of a temporary memory or buffer to be created or allocated and the rate for transferring the information to the display to obtain a continuous stream of information display between packets of information. The selective call device 130 also changes or varies the size of the temporary buffer in response to the variation of the information rate being sent by the selective call system.

Figure 2:
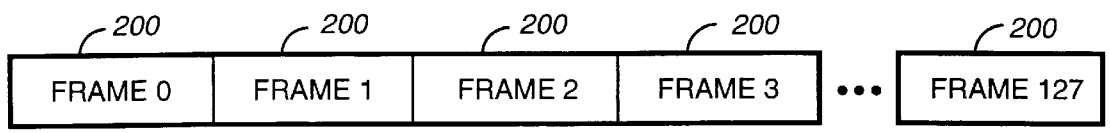
FIGS. 2–7 are timing diagrams illustrating the transmission format of the signaling protocol utilized by the selective call system of FIG. 1 in accordance with the preferred embodiment of the present invention.

Referring to FIGS. 2–5, timing diagrams of a signaling protocol in accordance with the preferred protocol for selective call messages are shown according to FIG. 1. Referring to FIG. 2, the selective call protocol is encoded, preferably according to the FLEX™ protocol, in a number of preferably one-hundred-twenty-eight (128) message packets or frames 200. Each frame 200 is preferably 1.875 seconds in duration and has a preferred base data rate of 6400 bits-per-second. Therefore, the entire 128 frames, each having a duration of 1.875 second, will take four minutes to transmit. It will be appreciated by one of ordinary skill in the art that other data rates can be used including the ability to use multiple data rates.

Figure 3:
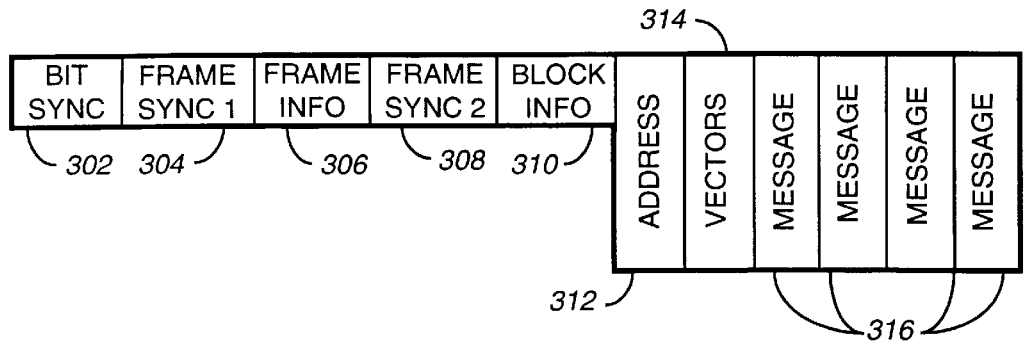

Referring to FIG. 3, each frame is comprised of a bit sync signal 302, preferably 32 bits of alternating 1,0 patterns, followed by a FRAME SYNC #1 signal 304 preferably having a predetermined thirty-two bit words and its thirty-two bit inverse, and a FRAME INFO signal 306, preferably one thirty-two bit word having twenty-one variable information bits containing information such as a cycle number and a frame number. The BIT SYNC signal 302 provides bit synchronization to the selective call device(s) 130 while the FRAME SYNC #1 signal 304 provides frame synchronization and includes the control signal indicative of the data rate of the message or information.

Following the FRAME INFO word 306 is a FRAME SYNC #2 308. Following the FRAME SYNC #2 308 is a block info word signal 310 including information such as the number of priority addresses, end of block information field, and vector start field. The code word of each frames 200 is preferably encoded as 31,21 Bose-Chaudhuri-Hocquenghem (BCH) code words having twenty-one information bits and ten parity bits generated according to the well known BCH algorithm. An additional even parity bit extends the word to a 32,21 code word. The addresses are located in block 312 and the vectors pointing to the messages are located in block 314 and the messages are located in the remaining blocks 316. Generally, all of the address signals within the frame are located in a first portion 312 and the information or message signals are located in a subsequent portion of the block 316. It is well known to those skilled in the art how to locate addresses 312 in a first portion and message information 316 in a second portion of the frame 200. Words 310–316 are shown in a vertical orientation to indicate that these words can be interleaved in order to improve the immunity of the transmission to burst errors. It is understood by one of ordinary skill in the art that interleaving can be modified or eliminated.

Figures 4, 5:
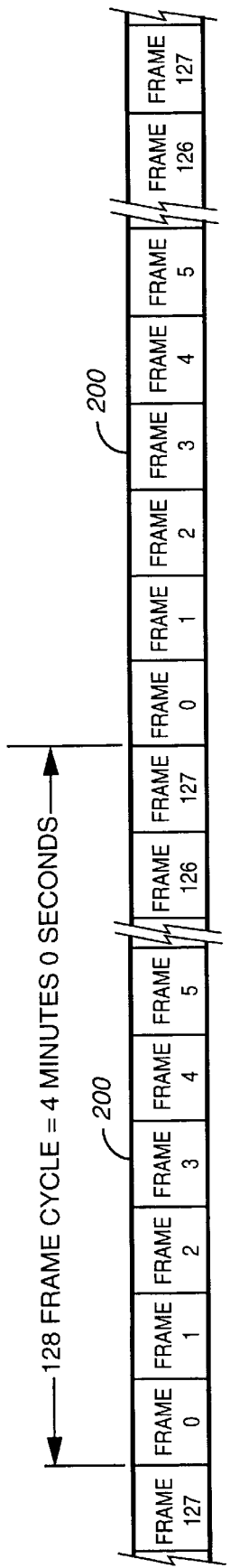

Referring to FIG. 4, the frames of the FLEX protocol is illustrated to emphasize the message information words 316 and to provide an example of the content of information that is be included in accordance with the preferred embodiment of the present invention. The information services 140–152 are encoded as message information words 316 for transmissions to the selective call devices 130. In particular, frame 3 of two transmissions are shown encoded with information as a sequence of information, the continuation of which is illustrated in FIG. 5. The illustration of FIG. 5 shows that a particular information can be divided at the word level, e.g., " . . . are expected to climb higher toad . . . y. *Sports* Last night the Cubs . . . " This information when received by the selective call device 130 will be pieced together and be provided to the user as a stream of continuous information even though the information is transmitted as a packet, e.g., in different frames. If more than one frame are used to transmit a segment, the frames need not be adjacent to each other or need not be organized in any predetermined order or sequence. The selective call system transmits the control data to inform the selective call devices of the organization and rate at which the information is being transmitted.

Figure 6:
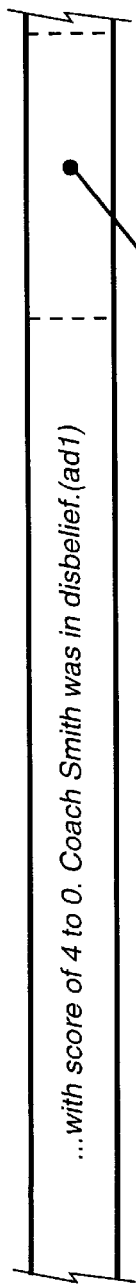
Figure 6:
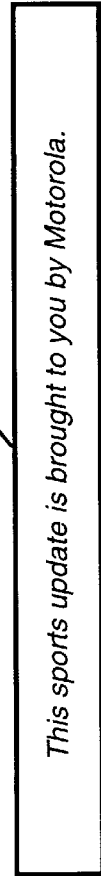
Figure 7:
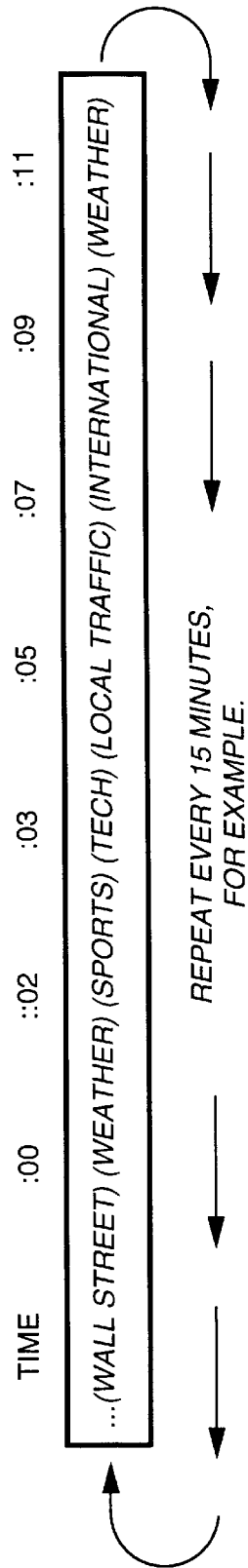

Referring to FIGS. 6 and 7, the information can be transmitted with various commercial advertisement. In particular, FIG. 6 shows that advertisements can also be part of the information content or stream. The interval between topics, if any, can be filled with different advertisements as shown. It is also possible to relax the load which the streaming information placed on the selective call system by updating an advertisement memory or register in the selective call device 130. Specifically, FIG. 6 calls reference to the company or entity that is promoting the information service, e.g., "This Sports update is brought to you by Motorola. " This information is preferably stored in a register of the selective call device 130.

FIG. 7 illustrates that the information is transmitted at intervals, e.g., in packets, although it is displayed as a continuous stream of information to the user. The information is transmitted at intervals in the form of segments or packets, which are pasted together by the selective call device and presented the user as a continuous stream of information. The selective call system can organize the information in different formats, e.g., each topic can be repeated at a set interval so that the users know when to expect what—for example, news updates come at every quarter hour, since the entire cycle lasts 15 minutes. The news stories would not necessarily be the same every cycle. FIG. 7 further illustrates an example in which at different time intervals, different information, e.g., "{wall street} {weather} {sports} {technology} {local traffic} {international} {weather} . . . " will be transmitted. In this example, the topics are transmitted to the users to inform them when particular information can be received.

Some selective call devices have two or more display lines, therefore each topical information section (weather, business news, sports, etc.) can be preceded by an indicator which can be displayed above the information stream on the selective call device to show the user the topic of the current information being displayed. In another embodiment, in the stream of information, the sections, for example weather and Wall Street data, are preceded by the names of the topics enclosed in brackets or any other suitable indicators. It is understood that many other ways exist to incorporate the title of the information including, but not limited to, embedding it with the information feed as part of the information. The contents of the stream as discussed above can appear above the stream on a multi-line display. Alternatively, in some selective call devices 130 with scrolling displays, the topic can be displayed before the information is presented.

Figure 8:
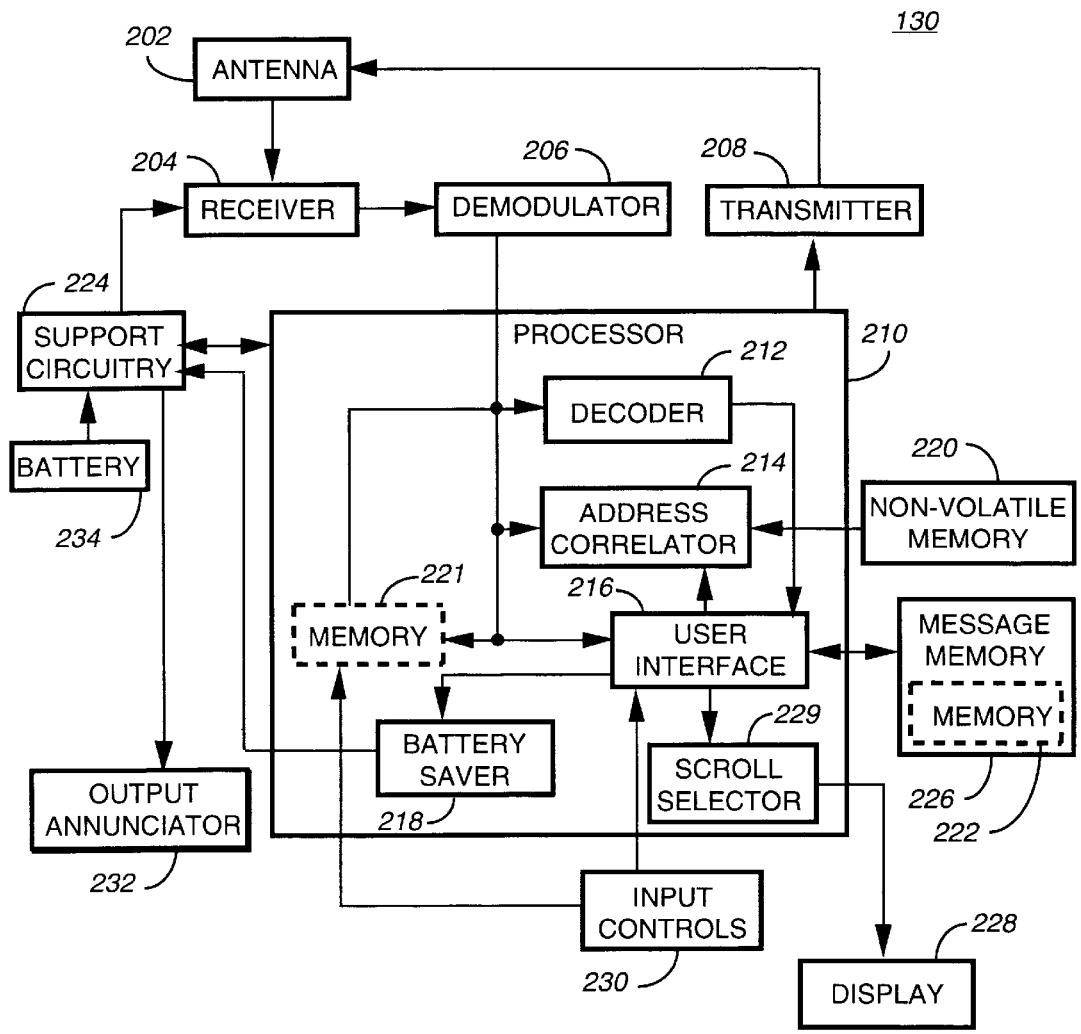
FIG. 8 is an electrical block diagram of a selective call device in accordance with the preferred embodiment of the present invention.

FIG. 8 shows an electrical block diagram of a selective call device according to the preferred embodiment of the present invention. The selective call device (e.g., transceiver or receiver) 130 is powered by a battery 234 and operates to receive and to transmit radio frequency signals via an antenna 202. A receiver 204 is coupled to the antenna 202 to receive the radio frequency signals. A demodulator 206 is coupled to the receiver 204 to recover any information signal present in the radio frequency signals using conventional techniques. The recovered information signal from the demodulator 206 is coupled to a controller or processor 210 that decodes the recovered information in a manner well known to those skilled in the art.

In the preferred embodiment, the controller or processor 210 comprises a microcomputer, such as a Motorola, Inc. manufactured microcomputer, e.g., 68HC11K4 or MC68HC11PH8, and has or comprises a signal processor performing the functions of a decoder which is normally implemented in both hardware and software. The signal processor comprises an address correlator 214 and a decoder 212, using methods and techniques known to those skilled in the art. The address correlator 214 checks the recovered information signal from the output of the demodulator 206 for address information and correlates a recovered address information with one of a plurality of predetermined address information that are stored in the selective call device's non-volatile memory 220. After the address correlator 214 determines that the received signal is directed to the selective call device 130, e.g., by correlating the address in the received signal to one of the predetermined addresses in the memory 220, the decoder 212 decodes the signal for, e.g., an application identifier to determine if the message contains information services data. Absence of the application identifier indicates that the message being decoded is a regular selective call message. Conversely, when the application identifier is present, the message comprises an information service.

When the user of the selective call device 130 has subscribed to or is able to receive at least one information service, memory 221 is created or allocated to temporarily receive the information to be displayed in real time or as soon as possible after it is received. The details of creating or allocating temporary memory will be discussed in details below. The information being received is displayed just after it is received, it does not accumulate in memory, as is the case with receiving information on a maildrop every fifteen minutes, for example. The selective call system encodes and transmits control data to the selective call device 130 indicating the amount of information that will be received and the periodic rate at which the information will be transmitted. The selective call system also informs the selective call devices 130 the frames (frame numbers) in which the information will be transmitted and the amount of information that will be transmitted in each frame. From this information, the selective call device 130 is able to determine an appropriate streaming rate for presenting the information to a display 228 and the size of the memory or temporary buffer 221 to be created.

After this determination, the temporary buffer or memory is created by determining, e.g., start and end pointers constituting the memory (or buffer) size to be allocated for temporarily receiving the information. The information is written to the temporary buffer that is created or allocated to retain the information until the processor 210 streams the information to a display 228. The temporary buffer 221 is reused over and over continuously as new information is received and old information is streamed to the display 228. Once the information is streamed to and is displayed, the information in the temporary buffer is not retained. New information replaces the old information. In this way, the rate of receipt of the information and the rate of presenting or scrolling the information to the display 228 is used as at least one factor for determining the size of the temporary buffer 221 to be created. Therefore, when the rate of information changes, the temporary buffer sizes change proportionally and/or the streaming rate or scrolling rate changes proportionally.

It was found, and well understood by those skilled in the art, that a scroll rate of 8 characters-per-second (cps) on a selective call device provides legible information rate that is convenient for the user to read. Using the FLEX™ 6400 protocol, an example for determining the scroll time-per-frame is shown by the following formula:

$$\frac{96 \text{ characters}}{\text{block}} \cdot \frac{10 \text{ blocks}}{\text{frame}} \cdot \frac{1 \text{ sec}}{8 \text{ characters}} = 120 \text{ sec of scroll time per frame}$$

Each frame can provide 120 seconds of scroll time, which means that a stream segment would have to be transmitted once every two minutes to have a continuous stream of information. This amounts to 2 frames-per-FLEX cycle, which lasts 4 minutes and is 128 frames long.

It is not necessary to space the frames exactly 120 seconds apart, however. If the selective call device is informed by the system when to expect the next stream segment, it can adjust the scroll rate accordingly. Further, it is possible to either space the frames at shorter distance or longer evenly spaced intervals. The trade-off in frame spacing is the size of the temporary memory or buffer 221 to be created or allocated. For example, 120 seconds of scroll time occupies only 960 bytes of RAM at 8 characters-per-second. Below is a table which illustrates some typical buffer sizes depending on the scroll rate of the display and FLEX frames:

| Scroll Rate (cps) | Stream Buffer Size (bytes) | FLEX Frame Required n Seconds for Continuous Stream |
|---|---|---|
| 6 | 480 | n = 80 |
| 6 | 960 | 160 |
| 6 | 1920 | 320 |
| 8 | 480 | 60 |
| 8 | 960 | 120 |
| 8 | 1920 | 240 |

By extrapolation, the update intervals and memory configurations for any scroll rate, etc., can be determined. Further, the selective call system can modify the load by dictating the scroll rates, and therefore control the resources necessary to update the stream buffer. Similarly, a user can input controls 230 and a scroll selector 229 as a switch to set the scroll rate he or she is more comfortable with thereby preventing the selective call system from setting or changing the scroll rate of the selective call device 130. Of course, a user who sets the scroll rate can risk losing information because when the information rate increases beyond the point where no more temporary memory can be allocated or created, the new information can over-write portions of the old information that was never streamed to the display. In such case the selective call device 130 can inform the user to increase the scroll rate to insure no information is lost. It is however preferable to prevent the overwriting of information because this cause truncation in the information being displayed. Alternatively, a reduce set of topics can be stored, or simply skip storing the incoming the information.

The temporary buffer or memory is shown as memory 221 and 222 with dashed lines. The dashed lines emphasis that the memory is created or allocated as needed and does not exist otherwise. The temporary memory 221, 222 can be created simultaneously in a message memory 226 or the internal memory of the processor. Additionally, the memory is shown as non-contiguous (e.g., memory 221 and memory 222) to further illustrate that the memory can be created or allocated either simultaneously or progressively from memory 221 internal to the processor 210 and/or the message memory 226 which is external to the processor, etc. According to the preferred embodiment of the present invention, the temporary memory that is created in, for example, memory 221 needs not be contiguous. It is well known to one skilled in the art that memory is created or allocated by defining both the start and end pointers to determine the memory size in which information can be stored. As the information rate changes, the memory allocation can change.

When the selective call device 130 receives and decodes the information service as designated, e.g., by the application identifier, the selective call device determines the scrolling rate to present the information from the temporary buffer 221, 222 to the display 228 as discussed above. The display 228, e.g., can be a liquid crystal display. A scroll selector 229 receives user inputs from the input controls 230 via user interface 216. The scroll selector 229 also changes or varies the scroll rate with inputs from the processor in response to the control data. The scroll selector 229 sets or varies the scroll rate of the information to be streamed to the display 228. One of ordinary skill in the art knows how to vary the rate of information to change the scroll rate of the display. Additionally, along with receiving, decoding, and creating the temporary buffer for storing the information, an alert is presented to the user via an output annunciator 232. The alert can include an audible alert, a visual alert, a vibratory or silent alert, or a combination of the aforementioned alerts, using known methods and techniques.

Support circuitry 224 preferably comprises a conventional signal multiplexing integrated circuit, a voltage regulator and control mechanism, a current regulator and control mechanism, audio power amplifier circuitry, control interface circuitry, and display illumination circuitry. These elements are arranged to provide support for the functions of the selective call device 130 as requested by a user.

Additionally, the processor 210 determines, as is well know, when to conserve power upon failure to detect address information. That is, when a received and recovered address information does not correlate with a predetermined address in the non-volatile memory 220, the processor 210 disables battery power via the support circuitry 224. Specifically, the battery saver 218 signals the support circuit 224 to enter a low power mode (battery save mode). A number of power consuming circuits is be directed to a low power or standby mode of operation. Additionally, the signal from the battery saver 218 signals or strobes the receiver circuitry 204 to a low power mode to conserve power. The battery saver 218 will re-enable the receiver and other circuits at some later time. Methods of power conservation strobing in selective call devices are known to those skilled in the art. Further, the controller or processor 210 inhibits any alerts to the user via the output annunciator 232. By not alerting again, power conservation is maximized. A transmitter 208 enables the selective call device 130 to transmit messages or control information as is well known in the art.

In this way, the streaming of information and the creation or allocation of memory features allow the selective call device to receive information from an information service provider and presents the information to the users in an easy to read format which will not accumulate in memory. The temporary buffer is analogous to a variable size bucket that is filled repeatedly and rapidly with information. The bucket leaks information through to the display generally at a slower rate, so a single update (or "refill") provides several minutes of reading (or leaking). No maildrop memory or message slots are necessary. Additionally, the streaming information feature can provide the user with the immediacy of a live news broadcast, with the convenience of an unconsciously worn selective call device. Receiving sports scores, world news, local weather, stock quotes, etc. immediately when the user selects the feature from the selective call device's menu is a concept which is very unlike the timed maildrops that is well known in the prior art. Interleaved between the timed information, the selective call device can incorporate advertisements as part of the information stream. In this way, it is also possible to relax the load which streaming information displaying places on the selective call system by updating an advertisement memory register(s) in the selective call device to be displayed at convenient times.

Since the information is displayed just after it is received, it does not accumulate in memory, as is the case with receiving information on maildrop every fifteen minutes, for example. The received information is written to a temporary buffer which is created only when it is needed. While the information is stream to the display, the temporary buffer is reused over and over continuously.

Figure 9:
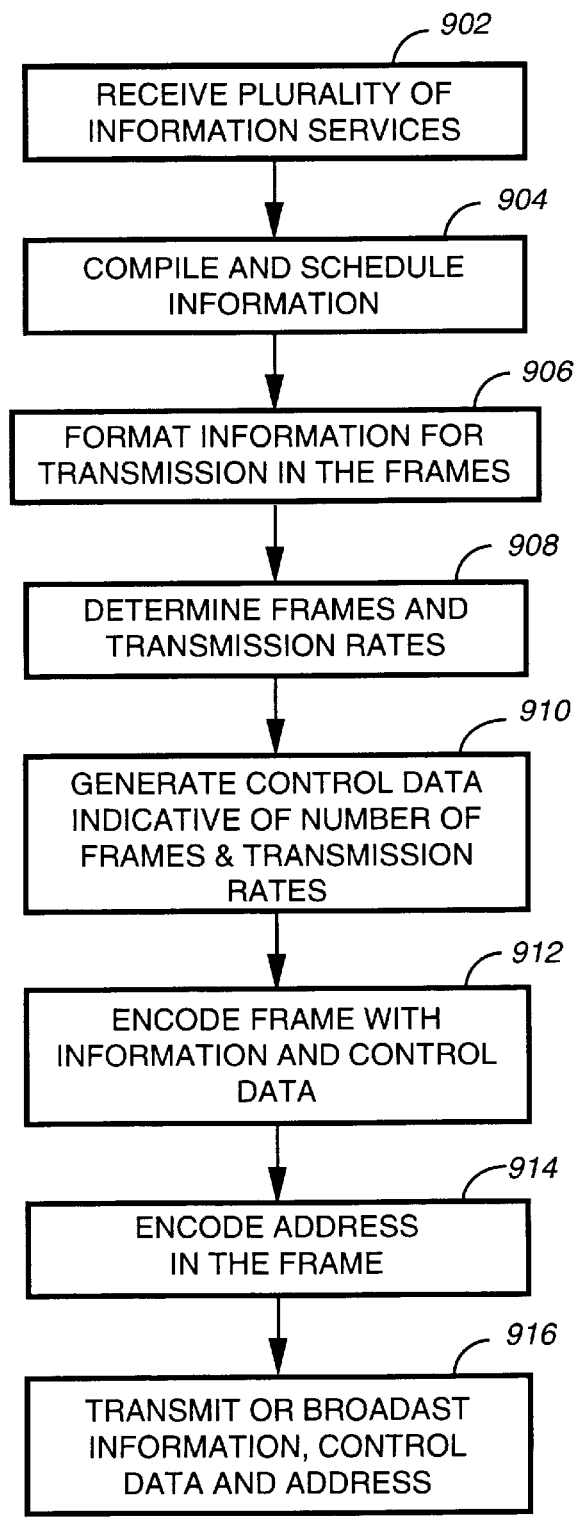
FIG. 9 is a flow diagram of the selective call system of FIG. 1 illustrating the steps of receiving and broadcasting information services.

Referring to FIG. 9, a flow diagram of the selective call system of FIG. 1 is shown illustrating the steps of receiving and broadcasting information to at least one selective call device. The plurality of information services 140–152 are provided to the selective call system, step 902. The information is compiled and scheduled for transmission, step 904. Most information sources, e.g. Cable Network News (CNN) or The Weather Channel, send a text feed to a central location which is responsible for compiling, tagging, and timing the feed for distribution to the selective call system or network. By timing the distribution by topic, subscribers know when to expect specific information themes. For example, a user can tune in at every quarter of the hour (e.g., 15 minutes, 30 minutes, 45 minutes, and on the hour) and expect to get the local weather forecast. The information is formatted by techniques well known to one skill in the art, step 906. The selective call system receives the information which is compiled and batched as a segment or frame for transmission. The segment length is arbitrary and can be chosen to suit the system load and information latency specifications. Spots can be left for local news or announcements which the local selective call provider or carrier can input into the information. The information segments should be long enough in length to provide the user with an uninterrupted flow or stream of information as the selective call device receives and streams each subsequent segments to the display. Each frame in which information will be encoded along with the transmission or broadcast rate are determined, step 908. The processor determines and generates the control data to be included in the frames to inform the selective call device the rate and the frames in which the information will be broadcast, step 910. The information and the control data are generated indicative of the number of frames and the transmission rate, step 912. If the frame is capcode assigned, the address is encoded in the frame so that the selective call device expects to receive each segment at regular intervals. Each frame is encoded with the information and the control data, step 914. If the frames are reserved, the frame numbers either remain constant or each frame can indicate the next frame to receive the next information segment. The frames are broadcast or transmitted with the information, control data and address, step 916. Even if the information segment is truncated mid-word, the next segment will be transmitted before the selective call device finishes or just as it finishes scrolling the current information segment from the buffer to the display. In this way, the user reads an uninterrupted stream of information when the selective call device 130 is in the streaming information mode. Additionally, if more than one frames-per-transmission are used to transmit a segment, the next frame need not be adjacent as discussed above.

Figure 10:
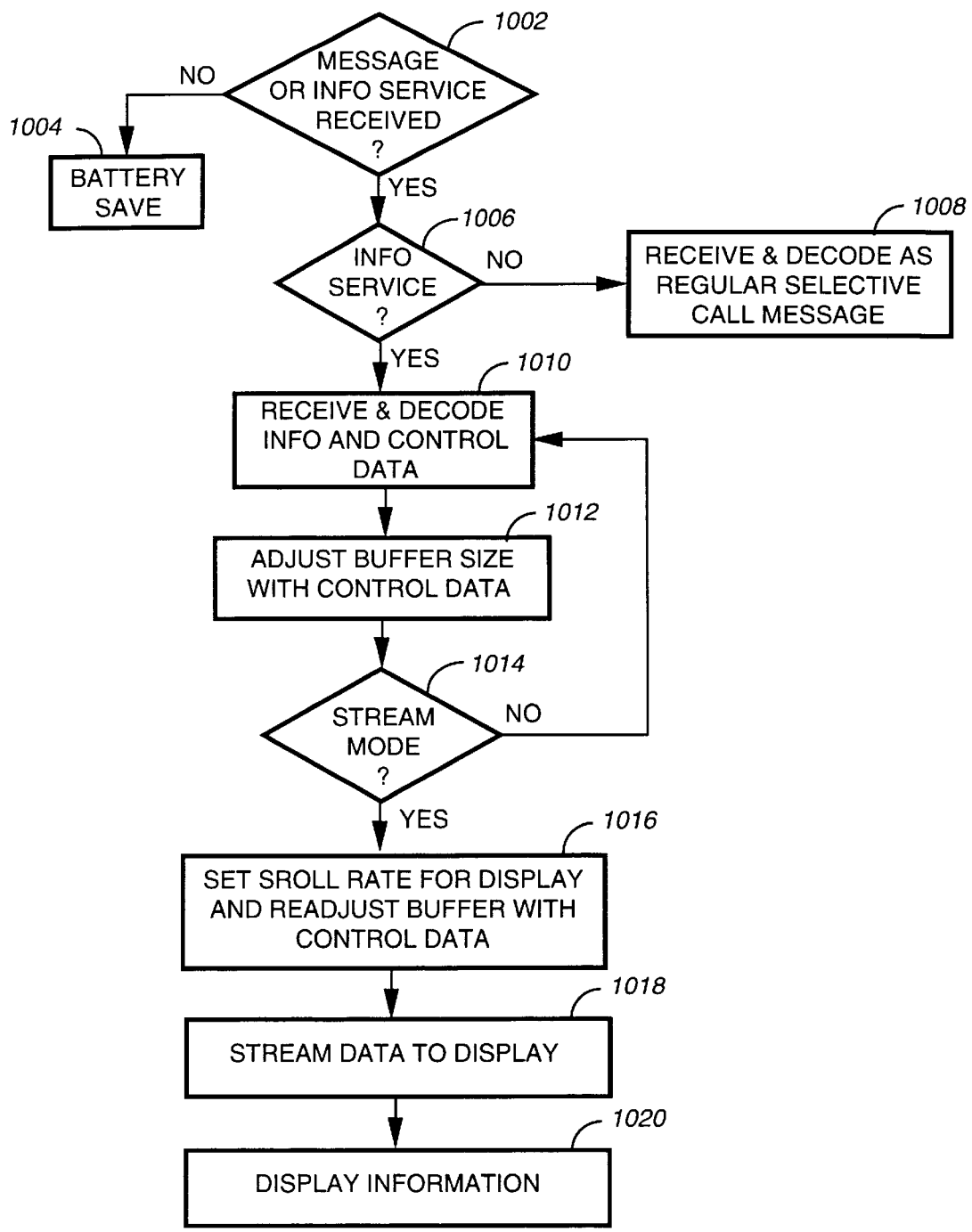
FIG. 10 is a flow diagram of the selective call device of FIG. 8 illustrating the steps of receiving and streaming information.

Referring to FIG. 10, a flow diagram of the selective call device of FIG. 8 is shown illustrating the steps of receiving information and determining the scroll rate to stream the information to the display. The message or information service is received, step 1002. When no information or data is directed to the selective call device, it battery saves, step 1004. When data is directed to the selective call device, the selective call device determines if the received data is from an information service, step 1006, e.g., from the application identifier. If not, the data is a regular selective call message which is received, decoded, and stored in memory 226, step 1008. When the data being received is from an information service, the information is received and the control data is decoded, step 1010. As described above, the information is transmitted at intervals or in packets to the selective call device.

As is well known, the selective call device turns on the receiver at the proper frame time, decodes the frame to obtain a segment of information which is placed into a temporary buffer that is created or allocated when the information is received. The selective call device uses the control data to determine the buffer size and the display rate. From the control data, the processor adjusts the buffer size or creates or allocates buffer as the case may be, step 1012. The processor checks if the steaming mode is selected, step 1014. The streaming mode can be selected, for example, by the user input controls 230 which are coupled to the user interface. The streaming mode enables the display of the information from the temporary memory to the display. In the streaming mode, the information is presented to the display as a continuous stream even though it is received in packets. The streaming information can be scrolled across the display screen at a rate which can be varied. For example, if the information segment contains 280 characters, the communications protocol is FLEX 6400 and the next frame or information segment is due in 40 frames which is not the expected location because selective call system has informed the selective call device of the next segment location. The display rate to which the device must adjust is calculated by determining the time when the next segment is due. For example, when the next segment is due in 75 seconds, the display rate is changed to 3.73 characters-per-second which is the number of characters-per-frame divided by the time to the next frame to ensure seamless streaming of information. In reality, the rate can be set slightly lower so that a few characters remain in the buffer while the next segment is decoded.

Another example for calculating the scroll rate includes the following: suppose the display rate is set at 8 characters-per-second (cps) and the temporary buffer is almost exhausted while the incoming segment is 576 characters long. If the communications protocol is FLEX 6400, then the next segment after the current incoming segment is due in 64 frames. It works out that the scroll rate has to be changed to maintain a continuous stream of information on the display. It is however, undesirable to change the scroll rate suddenly or by a large number. An example of preventing any sudden scroll rate change which can alarm the user who may believe that the selective call device is malfunctioning. The next segment is due in 120 seconds. The 576 characters has to be displayed over this 120 seconds time period to maintain a continuous stream. Since an instantaneous change in scroll rate from 8 cps to 4.8 cps is visually unpleasant, it is therefore more preferable to apply a gradual scroll rate adjustment gradient.

Referring to FIGS. 11 and 12 which illustrates how the scroll rate can be smoothly decreases until the desired rate is reached. Specifically, FIG. 11 shows a first or current information segment n, 1102 that is being scrolled or displayed at 8 characters-per-second and second segment, segment n+1, 1104 that, upon a determination, needs to be displayed at 4.8 characters-per-second to maintain a continuous stream of information. FIG. 12 shows a graph of the display rate changing from 8 character-per-second to 4.8 character-per-second. It is possible to change the instant at which the acceleration/deceleration begins. Although the example discusses slowing down the scroll rate, e.g., when the new display rate is slower for segment (n+1) than for segment n, this change can be accomplished by decreasing the information stream from the buffer to the display. While the scroll rate is being calculated, the buffer size has to be varied to accommodate the remaining characters plus the new characters since the buffer was not empty, as it would have been if the display rate change had been instantaneous. The scroll rate can be changed smoothly for both accelerating and decelerating the rate of flow of the information to the display. It is well understood by one skilled in the art that the acceleration and deceleration need no be linear.

It is understood that when a user selects the stream mode, a segment frame is not be scheduled for some time. If the system operator has chosen to keep the segment frame constant, the selective call device can calculate when the next segment will arrive, and display, e.g., a countdown for the user. During the time it takes to receive an information segment, the selective call device can display preprogrammed or prestored advertisements from memory as discussed above. The scroll rate or display rate can be calculated based on incoming data timing, by commands from the system or by user intervention as discussed above. If no instructions are contained in the incoming data, the messaging device will calculate the rate based on the amount of data in the buffer and the estimated time until the next segment.

Alternatively, the incoming information can contain instructions to control the scrolling rate. For example, if the terminal is heavily loaded and the next segment cannot be transmitted for a long time, control data embedded in the frame will instruct the selective call device to slow down the display rate. On the other hand, if a greater quantity of information is to be conveyed, the infrastructure can step-up the scrolling rate to fit all information segment. Additionally, the type of information can affect the rate of display or scrolling.

The user is able to control the rate of display. A real-time speed control via the input controls 230, the user interface 216 and the scroll selector 229 allow the user to accelerate or decelerate the rate at which the buffer empties to the display. Of course, if a segment is expected soon, the rate can be overridden to ensure a seamless stream.

The selective call device pastes together the information and presents it to the user with a continuous stream of data, step 1018. One attractive format of presenting the information includes presenting each topic to repeat at a set interval so that users knows what information are being displayed. The information is displayed on the selective call device's display as a continuous stream of information, step 1020. The streaming information is designed to give the selective call device user immediate access to information, while consuming as little memory as possible. For those selective call devices that have two or more display lines, the topical information section (weather, business news, sports, etc.) can be preceded by an indicator which can be displayed above the information stream on the selective call device to show the user the topic of the current information being received. Alternatively, the topic, for example the weather and Wall Street, can precede the information with the name of the topic enclosed in brackets. The contents of the stream can appear above the streamed information on a multi-line display; but on a single line display, the topic can be displayed before the information it precedes.

When the streaming mode is not selected step 1008, the user can have instant access to streaming information by having the selective call device always receiving and piecing together stream segments. This is possible because although the information is not displayed, it is being received and retained temporarily in the buffer that has been created or allocated. The compilation of the segments occurs in the background, and the buffer size is manipulated so that the timing and scroll rate are ideal to link to the next incoming segment as if it was being displayed. Similarly when the information data rate changes, the buffer size is varied or changed to match the information data rate. Therefore, when streaming mode is not selected, e.g., because the information is received in the background and is held temporarily in the buffer, the information is readily available when the streaming mode is selected. In this case, the buffer does not need to be created (because it was created in the background), it needs to be varied or resized depending on the amount and rate of information being received.

To extend battery life, alternatively, the selective call device does not begin receiving and compiling stream segments until the user explicitly selects the streaming mode. Therefore, the temporary buffer does not exist until the device is in the streaming mode. Upon the selection of the streaming mode, memory is created or allocated. In this case the user has to wait until the first segment of information is received before it can be displayed. A countdown can be started so that the user knows how long to wait, and/or advertisements can displayed from the advertisement registers.

In this way, the information appears on the selective call device's display at some scrolling rate. Then, the selective call device is prompted when the user has changed modes from or to the stream mode. In the stream mode, the buffer is refilled and information is displayed as a continuous stream of information while the size of the memory is adjusted to match the rate of receipt and transfers of the information to the display. If no streaming data is available, a message informs the user. If it is necessary to shuffle the addition transmitter load generated by streaming information, the size of the temporary buffer space or memory can be varied. For example, the size of the buffer or temporary memory can be grown or shrunk to accommodate given conditions.

In summary, a method in a selective call device comprises the steps of receiving information at a first rate, selecting a streaming mode for presenting the information, creating a buffer of a size suitable for retaining the information in response to selection of the streaming mode, calculating a second rate for transferring the information to a display as a continuous stream from the buffer, and displaying the information as stream of information corresponding with the second rate. The step of calculating further includes the steps of determining a period between frames of information being received and a number of characters per frame and determining a rate for displaying the information on the display before depleting the buffer during the period.

We claim:

1. A selective call device, comprising:
   a receiver for receiving information at a first rate;
   a switch for selecting a streaming mode for providing the information to a user;
   a processor for determining when the streaming mode is selected, and in response thereto, creating a buffer for retaining the information; the processor transfers the information from the buffer at a second rate, and wherein the processor calculates the second rate from a quantity of information being received in a frame and a scrolling rate of the display; and
   a display presents the information being transferred from the buffer as a continuous stream.

2. The selective call device according to claim 1 wherein the display presents the information by scrolling the information on the display.

3. The selective call device according to claim 1 wherein the display presents a topic associated with the information.

4. The selective call device according to claim 1 wherein the receiver receives control data.

5. The selective call device according to claim 4 wherein the control data further includes information from a selective call system for determining a rate at which the information will be broadcast.

6. The selective call device according to claim 4 wherein the processor calculates the first rate of receipt of the information from the control data and determines the second rate for transferring the information to the display to ensure that the information is presented as a continuous stream.

7. The selective call device according to claim 4 wherein the processor varies a size of the buffer in response to the control data.

8. The selective call device according to claim 1 wherein the processor calculates the first rate of receipt of the information at the receiver to determine the second rate for transferring the information to the display to ensure that the information is providing to the user as a continuous stream.

9. The selective call device according to claim 1 wherein the processor varies a size of the buffer in response to the first rate of the information.

10. A method, comprising the steps of:
    receiving information at a first rate;
    selecting a streaming mode for presenting the information;

creating a buffer of a size suitable for retaining the information in response to selection of the streaming mode;

calculating a second rate for transferring the information to a display as a continuous stream from the buffer, the step of calculating further calculates the second rate from a quantity of information being received in a frame and a scrolling rate for presenting the information to be displayed; and displaying the information as stream of information corresponding with the second rate.

11. The method according to claim 10 wherein the step of calculating further comprises the steps of:

determining a period between frames of information being received and a number of characters per frame; and determining a rate for displaying the information on the display before depleting the buffer during the period.

12. The method according to claim 11 wherein the step of calculating calculates the second rate as the number of characters received in a frame divided by the rate of displaying the information on the display to maintain a continuous stream of information during the period.

13. The method according to claim 10 wherein the step of displaying the information comprises scrolling the information on the display at the second rate.

14. The method according to claim 10 wherein the step of displaying displays the information including a topic associated with the information.

15. The method according to claim 10 wherein the step of receiving receives control data for designating the second rate of transferring the information to the display.

16. The method according to claim 10 wherein the step of calculating calculates the first rate of receipt of the information from control data included with the information and determines the second rate for transferring the information to the display to ensure that the information is presented as a continuous stream.

17. The method according to claim 10 further comprising the steps of determining the second rate in response to the first rate to ensure that the information is presented as a continuous stream.

18. The method according to claim 10 wherein the step of creating includes a step of varying a size of the buffer in response to a change in the first rate of the information being received.

19. A method, comprising the steps of:

receiving information at a first rate and control data;

creating a buffer of a size suitable for temporarily retaining the information received;

calculating a second rate for transferring the information as a stream from the buffer to a display, the step of calculating calculates the second rate from a quantity of information being received in a frame and a scrolling rate of the information to be displayed; and displaying the information as stream of information at the second rate.

20. The method according to claim 19 wherein the step of creating further comprises a step of varying the size of the buffer in response to a change of the first rate of information.

21. The method according to claim 19 wherein the step of calculating recalculates the second rate of transferring the information in response to the control data indicating a change in the first rate of receiving the information.

22. The method according to claim 19 wherein the step of calculating further comprises the steps of:

determining a period between frames of information being received and a number of characters per block; and determining a rate for displaying the information on the display before depleting the buffer during the period.

23. The method according to claim 22 wherein the step of calculating calculates the second rate as the number of characters received in a frame divided by the rate of displaying the information on the display to maintains a continuous stream on information during the period.

24. The method according to claim 19 wherein the step of displaying the information comprises scrolling the information on the display at the second rate.

25. The method according to claim 19 wherein the step of displaying displays the information including a topic associated with the information.

26. The method according to claim 19 wherein the step of receiving receives control data for designating the second rate of transferring the information to the display.

27. The method according to claim 19 wherein the step of calculating calculates the first rate of receipt of the information from the control data and determines the second rate for transferring the information to the display to ensure that the information is presented as a continuous stream.

28. The method according to claim 19 further comprising the steps of determining the second rate in response to the first rate to ensure that the information is presented as a continuous stream.

* * * * *